United States Patent
Wong et al.

(10) Patent No.: US 8,589,012 B2
(45) Date of Patent: Nov. 19, 2013

(54) METHOD AND APPARATUS FOR FACILITATING MAP DATA PROCESSING FOR INDUSTRIAL VEHICLE NAVIGATION

(75) Inventors: Lisa Wong, Auckland (NZ); Andrew Evan Graham, Waitakere (NZ); Christopher W. Goode, Auckland (NZ)

(73) Assignee: Crown Equipment Limited, Aukland (NZ)

( * ) Notice: Subject to any disclaimer, the term of this patent is extended or adjusted under 35 U.S.C. 154(b) by 122 days.

(21) Appl. No.: 13/159,501

(22) Filed: Jun. 14, 2011

(65) Prior Publication Data

US 2012/0323432 A1 Dec. 20, 2012

(51) Int. Cl.
*G01C 21/04* (2006.01)

(52) U.S. Cl.
USPC ................... 701/25; 701/23; 701/26

(58) Field of Classification Search
USPC .............................. 701/25, 23, 26
See application file for complete search history.

(56) References Cited

U.S. PATENT DOCUMENTS

| | | |
|---|---|---|
| 4,855,915 A | 8/1989 | Dallaire |
| 4,858,132 A | 8/1989 | Holmquist |
| 5,011,358 A | 4/1991 | Andersen et al. |
| 5,051,906 A | 9/1991 | Evans, Jr. et al. |
| 5,170,352 A | 12/1992 | McTamaney et al. |
| 5,202,832 A * | 4/1993 | Lisy .................... 701/24 |
| 5,471,393 A | 11/1995 | Bolger |
| 5,491,670 A | 2/1996 | Weber |
| 5,539,638 A | 7/1996 | Keeler et al. |
| 5,568,030 A | 10/1996 | Nishikawa et al. |
| 5,612,883 A | 3/1997 | Shaffer et al. |
| 5,646,845 A | 7/1997 | Gudat et al. |
| 5,682,317 A | 10/1997 | Keeler et al. |
| 5,916,285 A | 6/1999 | Alofs et al. |
| 5,961,571 A | 10/1999 | Gorr et al. |
| 6,012,003 A | 1/2000 | Astrom |
| 6,092,010 A | 7/2000 | Alofs et al. |
| 6,208,916 B1 | 3/2001 | Hori |
| 6,246,930 B1 | 6/2001 | Hori |
| 6,308,118 B1 | 10/2001 | Holmquist |
| 6,539,294 B1 | 3/2003 | Kageyama |
| 6,592,488 B2 | 7/2003 | Gassmann |
| 6,917,839 B2 * | 7/2005 | Bickford .................... 700/30 |

(Continued)

FOREIGN PATENT DOCUMENTS

DE 19757333 C1 9/1999
DE 10220936 A1 * 12/2003

(Continued)

OTHER PUBLICATIONS

International Search Report and Written Opinion mailed Oct. 31, 2012 for PCT/NZ2012/000091.

(Continued)

*Primary Examiner* — Mary Cheung
*Assistant Examiner* — Michael Berns
(74) *Attorney, Agent, or Firm* — Dinsmore & Shohl LLP (57) ABSTRACT

A method and apparatus for facilitating map data processing for industrial vehicle navigation is described. In one embodiment, the method of partitioning map data for industrial vehicle navigation includes segmenting map data associated with a physical environment into a plurality of sub-area maps, identifying a sub-area map that corresponds with a current vehicle location and navigating an industrial vehicle using the identified sub-area map.

14 Claims, 9 Drawing Sheets

(56) References Cited

U.S. PATENT DOCUMENTS

| | | |
|---|---|---|
| 6,952,488 B2 | 10/2005 | Kelly et al. |
| 7,148,458 B2 | 12/2006 | Schell et al. |
| 7,162,338 B2 | 1/2007 | Goncalves et al. |
| 7,177,737 B2 | 2/2007 | Karlsson et al. |
| 7,272,467 B2 | 9/2007 | Goncalves et al. |
| 7,539,563 B2 | 5/2009 | Yang et al. |
| 7,646,336 B2 | 1/2010 | Tan et al. |
| 7,679,532 B2 | 3/2010 | Karlsson et al. |
| 7,688,225 B1 | 3/2010 | Haynes et al. |
| 7,689,321 B2 | 3/2010 | Karlsson |
| 7,720,554 B2 | 5/2010 | DiBernardo et al. |
| 7,734,385 B2 | 6/2010 | Yang et al. |
| 7,844,364 B2 | 11/2010 | McLurkin et al. |
| 7,996,097 B2 | 8/2011 | DiBernardo et al. |
| 8,020,657 B2 | 9/2011 | Allard et al. |
| 8,050,863 B2 | 11/2011 | Trepagnier et al. |
| 8,103,383 B2 | 1/2012 | Nakamura |
| 8,126,642 B2 | 2/2012 | Trepagnier et al. |
| 8,150,650 B2 | 4/2012 | Goncalves et al. |
| 8,204,679 B2 | 6/2012 | Nakamura |
| 8,255,107 B2 | 8/2012 | Yang et al. |
| 8,280,623 B2 | 10/2012 | Trepagnier et al. |
| 2004/0030493 A1* | 2/2004 | Pechatnikov et al. ......... 701/208 |
| 2004/0202351 A1 | 10/2004 | Park et al. |
| 2004/0249504 A1 | 12/2004 | Gutmann et al. |
| 2005/0149256 A1* | 7/2005 | Lawitzky et al. ............. 701/207 |
| 2005/0182518 A1 | 8/2005 | Karlsson |
| 2006/0181391 A1 | 8/2006 | McNeill et al. |
| 2006/0184013 A1 | 8/2006 | Emanuel et al. |
| 2007/0061043 A1* | 3/2007 | Ermakov et al. ............. 700/263 |
| 2007/0090973 A1 | 4/2007 | Karlsson et al. |
| 2007/0106465 A1 | 5/2007 | Adam et al. |
| 2007/0150097 A1 | 6/2007 | Chae et al. |
| 2007/0153802 A1 | 7/2007 | Anke et al. |
| 2007/0262884 A1 | 11/2007 | Goncalves et al. |
| 2009/0140887 A1 | 6/2009 | Breed et al. |
| 2009/0216438 A1 | 8/2009 | Shafer |
| 2010/0161224 A1 | 6/2010 | Lee et al. |
| 2010/0222925 A1 | 9/2010 | Anezaki |
| 2010/0256908 A1 | 10/2010 | Shimshoni et al. |
| 2010/0268697 A1 | 10/2010 | Karlsson et al. |
| 2011/0010023 A1 | 1/2011 | Kunzig et al. |
| 2011/0121068 A1 | 5/2011 | Emanuel et al. |
| 2011/0125323 A1 | 5/2011 | Gutmann et al. |
| 2011/0150348 A1 | 6/2011 | Anderson |
| 2011/0153338 A1 | 6/2011 | Anderson |
| 2011/0230207 A1 | 9/2011 | Hasegawa |
| 2012/0035797 A1 | 2/2012 | Oobayashi et al. |
| 2012/0101784 A1 | 4/2012 | Lindores et al. |
| 2012/0191272 A1 | 7/2012 | Andersen et al. |
| 2012/0323431 A1* | 12/2012 | Wong et al. .................... 701/25 |
| 2013/0006420 A1 | 1/2013 | Karlsson et al. |

FOREIGN PATENT DOCUMENTS

| | | | |
|---|---|---|---|
| DE | 10234730 A1 | * | 2/2004 |
| DE | 102007021693 A1 | | 11/2008 |
| EP | 1732247 A1 | | 12/2006 |
| GB | 2389947 A | | 12/2003 |
| JP | 60067818 A | | 4/1985 |
| JP | 2002048579 A | | 2/2002 |
| JP | 2002108446 A | | 4/2002 |
| JP | 2005114546 A | | 4/2005 |
| WO | 03096052 A2 | | 11/2003 |

OTHER PUBLICATIONS

Borenstein et al. "Mobile Robot Positioning—Sensors and Techniques", Journal of Robotic Systems, Special Issue on Mobile Robots, vol. 14, No. 4, pp. 231-249, Apr. 1997.

Harmon et al., "A Technique for Coordinating Autonomous Robots", Autonomous Systems Branch Naval Ocean Systems Center San Diego, CA 92152, 1986.

Jansfelt et al., "Laser Based Position Acquisition and Tracking in an Indoor Environment", Proc. Int. Symp. Robotics and Automation, 1998.

Siadat et al., "An Optimized Segmentation Method for a 2D Laser-Scanner Applied to Mobile Robot Navigation", Proceedings of the 3rd IFAC Sympo9sium on Intelligent Components and Instruments for Control Applications, 1997.

International Search Report and Written Opinion pertaining to International Patent Application No. PCT/NZ2012/000084, dated Jan. 30, 2013.

Search Report/Written Opinion from PCT/NZ2012/000051 mailed Jan. 2, 2013.

Search Report/Written Opinion from PCT/US2012/054062 mailed Nov. 27, 2012.

Search Report/Written Opinion from PCT/US2012/052247 mailed Nov. 27, 2012.

Office Action from U.S. Appl. No. 12/948,358 mailed Apr. 8, 2013.
Office Action from U.S. Ser. No. 660,616 mailed Nov. 27, 2013.
"Three Engineers, Hundreds of Robots, One Warehouse," Guizzo, IEEE Spectrum, Jul. 2008.

Office Action from U.S. Appl. No. 13/116,600 mailed Dec. 31, 2012.
Office Action mailed May 8, 2013 from U.S. Appl. No. 13/672,260, filed Nov. 8, 2012.

Office Action mailed May 21, 2013 from U.S. Appl. No. 12/718,620, filed Mar. 5, 2010.

Office Action mailed Jul. 12, 2013 from U.S. Appl. No. 13/227,165, filed Sep. 7, 2011.

Office Action pertaining to U.S. Appl. No. 13/159,500, dated Mar. 26, 2013.

Office Action pertaining to U.S. Appl. No. 13/219,271, dated Feb. 25, 2013.

Office Action pertaining to U.S. Appl. No. 13/153,743, dated Mar. 4, 2013.

* cited by examiner

METHOD AND APPARATUS FOR FACILITATING MAP DATA PROCESSING FOR INDUSTRIAL VEHICLE NAVIGATION

BACKGROUND

1. Technical Field

Embodiments of the present invention generally relate to environment based navigation systems for industrial vehicles and, more particular, to a method and apparatus for facilitating map data processing for industrial vehicle navigation.

2. Description of the Related Art

Entities regularly operate numerous facilities in order to meet supply and/or demand goals. For example, small to large corporations, government organizations and/or the like employ a variety of logistics management and inventory management paradigms to move objects (e.g., raw materials, goods, machines and/or the like) into a variety of physical environments (e.g., warehouses, cold rooms, factories, plants, stores and/or the like). A multinational company may build warehouses in one country to store raw materials for manufacture into goods, which are housed in a warehouse in another country for distribution into local retail markets. The warehouses must be well-organized in order to maintain and/or improve production and sales. If raw materials are not transported to the factory at an optimal rate, fewer goods are manufactured. As a result, revenue is not generated for the unmanufactured goods to counterbalance the costs of the raw materials.

Unfortunately, physical environments, such as warehouses, have several limitations that prevent timely completion of various tasks. Warehouses and other shared use spaces, for instance, must be safe for a human work force. Some employees operate heavy machinery and industrial vehicles, such as forklifts, which have the potential to cause severe or deadly injury. Nonetheless, human beings are required to use the industrial vehicles to complete tasks, which include object handling tasks, such as moving pallets of goods to different locations within a warehouse. Most warehouses employ a large number of forklift drivers and forklifts to move objects. In order to increase productivity, these warehouses simply add more forklifts and forklift drivers.

Some warehouses utilize equipment for automating these tasks. As an example, these warehouses may employ automated industrial vehicles, such as forklifts, to carry objects on paths and then, unload these objects onto designated locations. When navigating an industrial vehicle, it is necessary to process map data efficiently and quickly in order to formulate these paths. If the industrial vehicle must compare sensor measurements with feature information associated with each and every landmark to compute the vehicle position, the time required to perform the computations requires the industrial vehicle to move slowly and ineffectively. A drawback of an Extended Kalman filter (EKF) approach is that dynamically added landmarks impose an immense computational cost on localization and mapping. To provide accurate localization information in real time, a number of dynamic landmarks being managed by the EKF at any time are minimized.

Therefore, there is a need in the art for a method and apparatus for facilitating map data processing for industrial vehicle navigation by reducing a number of features to process and/or store to perform vehicle localization.

SUMMARY

Various embodiments of the present invention generally include a method and apparatus for facilitating map data processing for industrial vehicle navigation. In one embodiment, the method of partitioning map data for industrial vehicle navigation includes segmenting map data associated with a physical environment into a plurality of sub-area maps, identifying a sub-area map that corresponds with a current vehicle location and navigating an industrial vehicle using the identified sub-area map.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
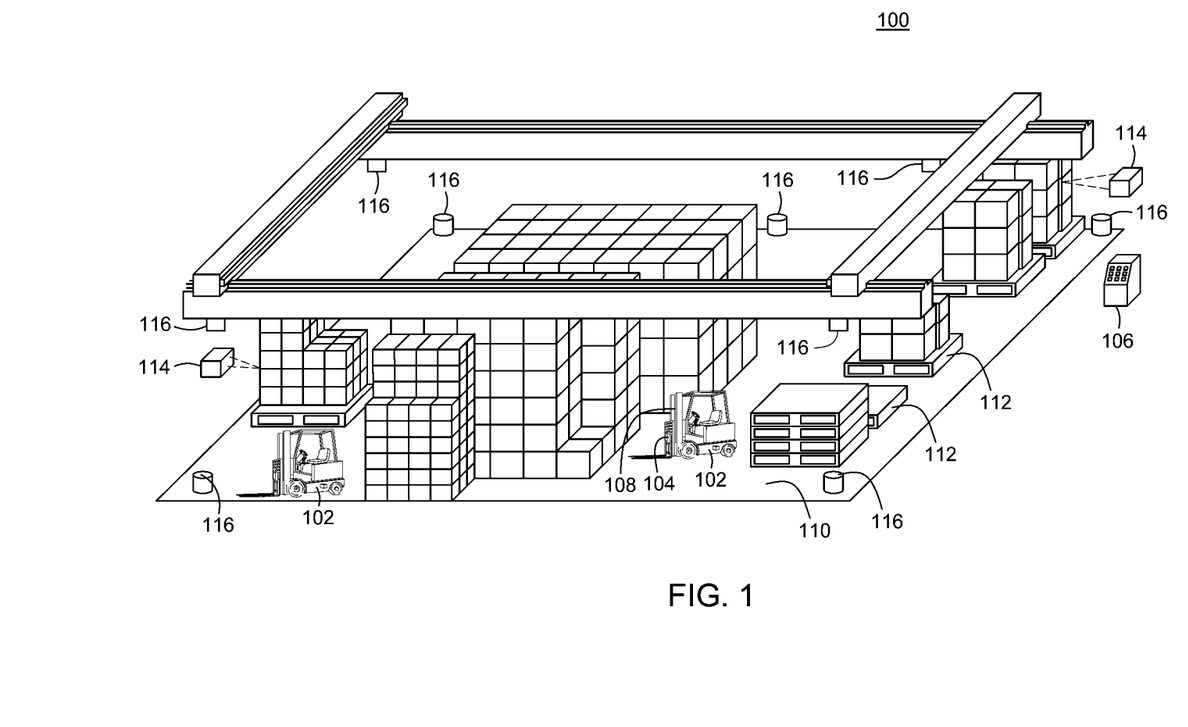
FIG. 1 is a perspective view of a physical environment comprising various embodiments of the present disclosure.

FIG. 1 illustrates a schematic, perspective view of a physical environment 100 comprising one or more embodiments of the present invention.

In some embodiments, the physical environment 100 includes a vehicle 102 that is coupled to a mobile computer 104, a central computer 106 as well as a sensor array 108. The sensor array 108 includes a plurality of devices for analyzing various objects within the physical environment 100 and transmitting data (e.g., image data, video data, map data, three-dimensional graph data and/or the like) to the mobile computer 104 and/or the central computer 106, as explained further below. The sensor array 108 includes various types of sensors, such as encoders, ultrasonic range finders, laser range finders, pressure transducers and/or the like.

The physical environment 100 further includes a floor 110 supporting a plurality of objects. The plurality of objects include a plurality of pallets 112, a plurality of units 114 and/or the like as explained further below. The physical environment 100 also includes various obstructions (not pictured) to the proper operation of the vehicle 102. Some of the plurality of objects may constitute obstructions along various paths (e.g., pre-programmed or dynamically computed routes) if such objects disrupt task completion. For example, an obstacle includes a broken pallet at a target destination associated with an object load being transported. The physical environment 100 also includes a plurality of markers 116. The plurality of markers 116 are illustrated as objects attached to a ceiling. In some embodiments, the markers 116 may be located on the floor or a combination of the floor and ceiling. In some embodiments, the plurality of markers 116 are beacons that facilitate environment based navigation as explained further below. The plurality of markers 116 as well as other objects around the physical environment 100 form landmarks defined by environmental features. The mobile computer 104 extracts the environment features and determines an accurate, current vehicle pose.

The physical environment 100 may include a warehouse or cold store for housing the plurality of units 114 in preparation for future transportation. Warehouses may include loading docks to load and unload the plurality of units from commercial vehicles, railways, airports and/or seaports. The plurality of units 114 generally include various goods, products and/or raw materials and/or the like. For example, the plurality of units 114 may be consumer goods that are placed on ISO standard pallets and loaded into pallet racks by forklifts to be distributed to retail stores. The vehicle 102 facilitates such a distribution by moving the consumer goods to designated locations where commercial vehicles (e.g., trucks) load and subsequently deliver the consumer goods to one or more target destinations.

According to one or more embodiments, the vehicle 102 may be an automated guided vehicle (AGV), such as an automated forklift, which is configured to handle and/or move the plurality of units 114 about the floor 110. The vehicle 102 utilizes one or more lifting elements, such as forks, to lift one or more units 114 and then, transport these units 114 along a path within a transit area 120 (e.g., corridor) to be placed at a slot area 122. Alternatively, the one or more units 114 may be arranged on a pallet 112 of which the vehicle 102 lifts and moves to the designated location.

Each of the plurality of pallets 112 is a flat transport structure that supports goods in a stable fashion while being lifted by the vehicle 102 and/or another jacking device (e.g., a pallet jack and/or a front loader). The pallet 112 is the structural foundation of an object load and permits object handling and storage efficiencies. Various ones of the plurality of pallets 112 may be utilized within a rack system (not pictured). Within a certain rack system, gravity rollers or tracks allow one or more units 114 on one or more pallets 112 to flow to the front. The one or more pallets 112 move forward until slowed or stopped by a retarding device, a physical stop or another pallet 112.

In some embodiments, the mobile computer 104 and the central computer 106 are computing devices that control the vehicle 102 and perform various tasks within the physical environment 100. The mobile computer 104 is adapted to couple with the vehicle 102 as illustrated. The mobile computer 104 may also receive and aggregate data (e.g., laser scanner data, image data and/or any other related sensor data) that is transmitted by the sensor array 108. Various software modules within the mobile computer 104 control operation of hardware components associated with the vehicle 102 as explained further below.

The physical environment 100 may be characterized as a dynamic shared use area in which pallets are expected to be placed on the floor 110 at known locations. Both the mobile computer 104 and/or central computer 106 perform dynamic mapping of the physical environment 100 at run time to maintain an up-to-date global map of the physical environment. In some embodiments, the central computer 104 segments a global map into smaller sub-area maps and sends the sub-area maps to the vehicles. In this manner, the mobile computer 104 has less features of landmarks to process at any given time, e.g., only processing landmarks which are either in a sub-area map in which the industrial vehicle 102 currently operates or are visible to the industrial vehicle 102 at its current position or a combination of both. In other embodiments, the global map is stored by the mobile computer 104 and the mobile computer 104 uses only a sub-area map extracted from the global map to navigate. Once the industrial vehicle 102 approaches a new sub-area, the central computer 104 sends a corresponding sub-area map, or the mobile computer 104 extracts a corresponding sub-area map from its locally stored global map. The mobile computer 104 may also update the corresponding sub-area map with feature information that is communicated by at least one second industrial vehicle 102.

Figure 2:
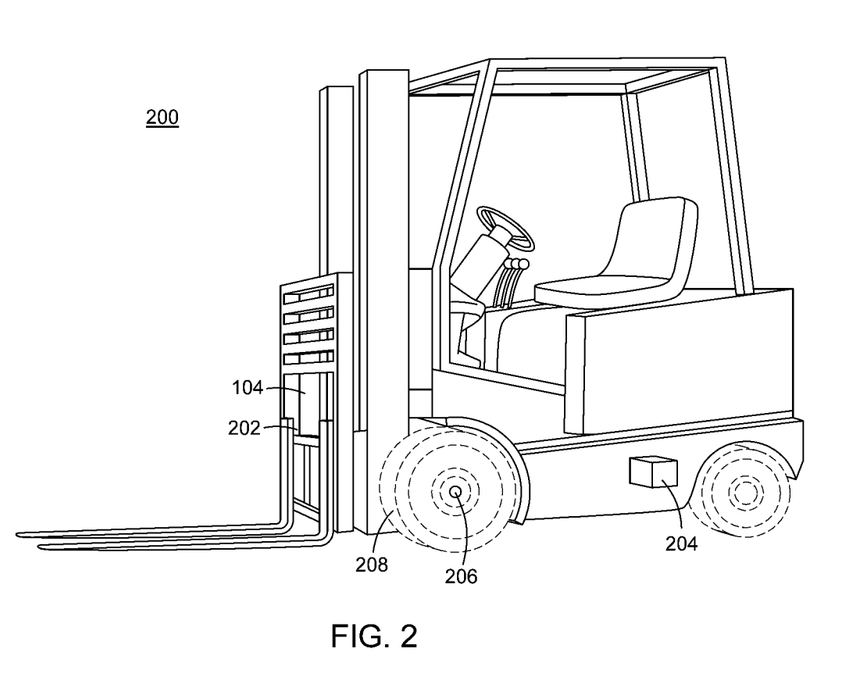
FIG. 2 illustrates a perspective view of the forklift for navigating a physical environment to perform various tasks according to one or more embodiments.

FIG. 2 illustrates a perspective view of the forklift 200 for facilitating automation of various tasks within a physical environment according to one or more embodiments of the present invention.

The forklift 200 (i.e., a lift truck, a high/low, a stacker-truck, trailer loader, sideloader or a fork hoist) is a powered industrial truck having various load capacities and used to lift and transport various objects. In some embodiments, the forklift 200 is configured to move one or more pallets (e.g., the pallets 112 of FIG. 1) of units (e.g., the units 114 of FIG. 1) along paths within the physical environment (e.g., the physical environment 100 of FIG. 1). The paths may be pre-defined or dynamically computed as tasks are received. The forklift 200 may travel inside a storage bay that is multiple pallet positions deep to place or retrieve a pallet. Oftentimes, the forklift 200 is guided into the storage bay and places the pallet on cantilevered arms or rails. Hence, the dimensions of the forklift 200, including overall width and mast width, must be accurate when determining an orientation associated with an object and/or a target destination.

The forklift 200 typically includes two or more forks (i.e., skids or tines) for lifting and carrying units within the physical environment. Alternatively, instead of the two or more forks, the forklift 200 may include one or more metal poles (not pictured) in order to lift certain units (e.g., carpet rolls, metal coils and/or the like). In one embodiment, the forklift 200 includes hydraulics-powered, telescopic forks that permit two or more pallets to be placed behind each other without an aisle between these pallets.

The forklift 200 may further include various mechanical, hydraulic and/or electrically operated actuators according to one or more embodiments. In some embodiments, the forklift 200 includes one or more hydraulic actuator (not labeled) that permit lateral and/or rotational movement of two or more forks. In one embodiment, the forklift 200 includes a hydraulic actuator (not labeled) for moving the forks together and apart. In another embodiment, the forklift 200 includes a mechanical or hydraulic component for squeezing a unit (e.g., barrels, kegs, paper rolls and/or the like) to be transported.

The forklift 200 may be coupled with the mobile computer 104, which includes software modules for operating the forklift 200 in accordance with one or more tasks. The forklift 200 is also coupled with an array comprising various sensor devices (e.g., the sensor array 108 of FIG. 1), which transmits sensor data (e.g., image data, video data, range map data and/or three-dimensional graph data) to the mobile computer 104 for extracting information associated with environmental features. These devices may be mounted to the forklift 200 at any exterior and/or interior position or mounted at known locations around the physical environment 100. Exemplary embodiments of the forklift 200 typically includes a camera 202, a planar laser scanner 204 attached to each side and/or an encoder 206 attached to each wheel 208. In other embodiments, the forklift 200 includes only the planar laser scanner 204 and the encoder 206. The forklift 200 may use any sensor array with a field of view that extends to a current direction of motion (e.g., travel forwards, backwards, fork motion up/down, reach out/in and/or the like). These encoders determine motion data related to vehicle movement. Externally mounted sensors may include laser scanners or cameras positioned where the rich data set available from such sensors would enhance automated operations. External sensors may include a limited set transponders and/or other active or passive means by which an automated vehicle could obtain an approximate position to see a localization function.

In some embodiments, a number of sensor devices (e.g., laser scanners, laser range finders, encoders, pressure transducers and/or the like) as well as their position on the forklift 200 are vehicle dependent, and the position at which these sensors are mounted affects the processing of the measurement data. For example, by ensuring that all of the laser scanners are placed at a measurable position, the sensor array 108 may process the laser scan data and transpose it to a center point for the forklift 200. Furthermore, the sensor array 108 may combine multiple laser scans into a single virtual laser scan, which may be used by various software modules to control the forklift 200.

Figure 3:
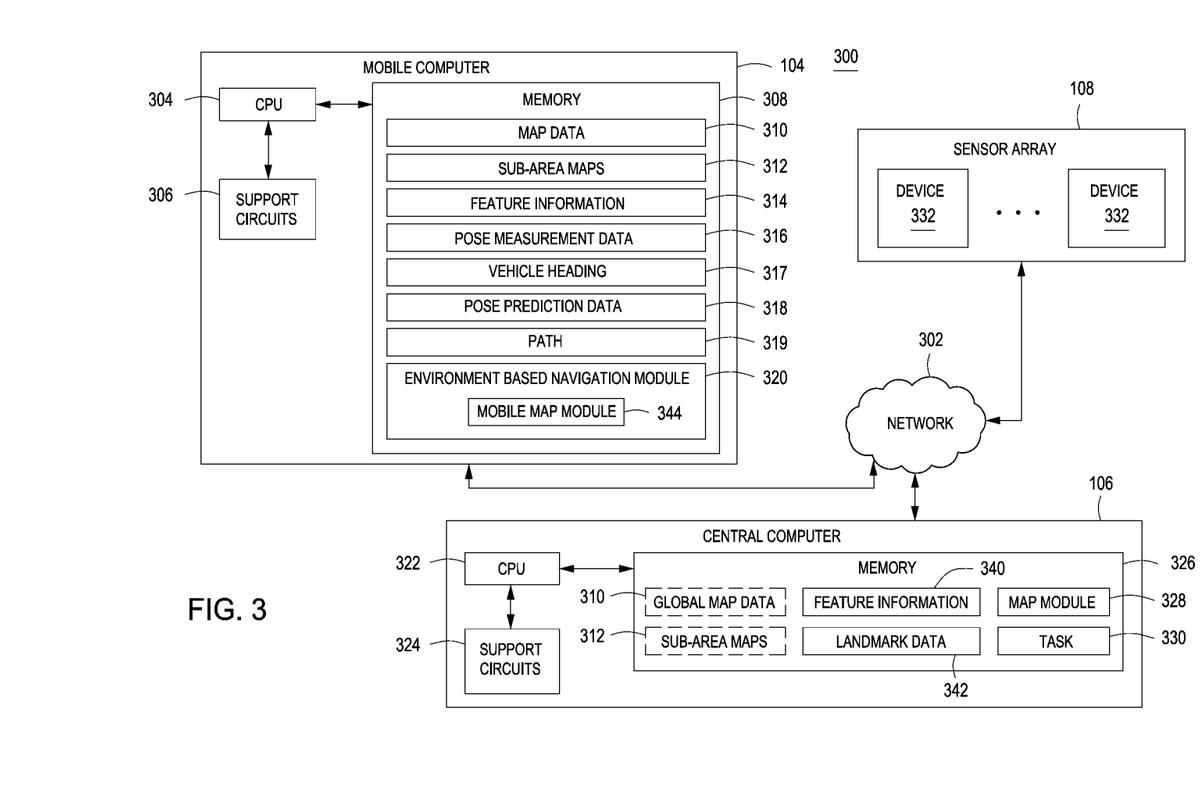
FIG. 3 is a structural block diagram of a system for providing accurate localization for an industrial vehicle according to one or more embodiments

FIG. 3 is a structural block diagram of a system 300 for providing accurate localization for an industrial vehicle according to one or more embodiments. In some embodiments, the system 300 includes the mobile computer 104, the central computer 106 and the sensor array 108 in which each component is coupled to each other through a network 302.

The mobile computer 104 is a type of computing device (e.g., a laptop, a desktop, a Personal Digital Assistant (PDA) and the like) that comprises a central processing unit (CPU) 304, various support circuits 306 an*d a memory 308. The CPU 304 may comprise one or more commercially available microprocessors or microcontrollers that facilitate data processing and storage. Various support circuits 306 facilitate operation of the CPU 304 and may include clock circuits, buses, power supplies, input/output circuits and/or the like. The memory 308 includes a read only memory, random access memory, disk drive storage, optical storage, removable storage, and the like. The memory 308 includes various data, such as map data 310, a plurality of sub-area maps 312, feature information 314, pose measurement data 316, a vehicle heading 317, pose prediction data 318 and a path 319. The memory 308 includes various software packages, such as an environment based navigation module 420.

The central computer 106 is a type of computing device (e.g., a laptop computer, a desktop computer, a Personal Digital Assistant (PDA) and the like) that comprises a central processing unit (CPU) 322, various support circuits 324 and a memory 326. The CPU 322 may comprise one or more commercially available microprocessors or microcontrollers that facilitate data processing and storage. Various support circuits 324 facilitate operation of the CPU 322 and may include clock circuits, buses, power supplies, input/output circuits and/or the like. The memory 326 includes a read only memory, random access memory, disk drive storage, optical storage, removable storage, and the like. The memory 326 includes various software packages, such as a mapping module 328, as well as various data, such as a task 430. Optionally, the memory 326 stores a copy of global map data 310 (representing a global map) and/or the sub-area maps 312.

The network 302 comprises a communication system that connects computing devices by wire, cable, fiber optic, and/or wireless links facilitated by various types of well-known network elements, such as hubs, switches, routers, and the like. The network 302 may employ various well-known protocols to communicate information amongst the network resources. For example, the network 302 may be part of the Internet or intranet using various communications infrastructure such as Ethernet, WiFi, WiMax, General Packet Radio Service (GPRS), and the like.

The sensor array 108 is communicably coupled to the mobile computer 104, which is attached to an automated vehicle, such as a forklift (e.g., the forklift 200 of FIG. 2). The sensor array 108 includes a plurality of devices 322 for monitoring a physical environment and capturing various data, which is stored by the mobile computer 104 as the sensor input messages 312. In some embodiments, the sensor array 108 may include any combination of one or more laser scanners and/or one or more cameras. In some embodiments, the plurality of devices 332 may be mounted to the automated vehicle. For example, a laser scanner and a camera may be attached to a lift carriage at a position above the forks. Alternatively, the laser scanner and the camera may be located below the forks. The plurality of devices 332 may also be distributed throughout the physical environment at fixed positions.

In some embodiments, the global map data 310 includes dynamic features and/or static features of a physical environment, such as a shared use area for human workers and automated industrial vehicles. The global map data 310 comprises feature information 340 and landmark data 342 (as is illustrated in FIG. 3). In one embodiment, the feature information includes a dynamic and/or static features representing a physical environment proximate the vehicle, such as a shared use area for human workers and automated industrial vehicles. Static features represent objects that do not change within the environment, e.g., walls, storage racks, and the like. The map data 310 may be organized to form a vector of known landmarks, static and dynamic features. In some embodiments feature information 340 include: feature geometry (line, corner, arc, etc.); a feature pose in global coordinate system; and a feature pose uncertainty. Typically, the pose uncertainty for static features is zero.

In some embodiments dynamic features represent objects that change within the environment, e.g. temporary obstructions such as broken pallets, objects to be stored, and the like. These features are likely to be stationary for a sufficient amount of time for the system to use them as localization map features. The system does not contain a-priori information about the pose of these features and thus the pose of these dynamic features can only be inferred by superimposing the vehicle centric measurement from sensors onto the estimated pose of the vehicle with respect to the global coordinate system. Because of the noise in sensor data, as well as the uncertainty in the vehicle pose estimation, all dynamic features have a pose uncertainty associated with their pose.

The physical environment may be segmented into a plurality of sub-areas with corresponding map data stored in the plurality of sub-area maps 312. The feature information 314 defines features (e.g., curves, lines and/or the like) associated with various landmarks. These landmarks may be pre-defined and identified in a static map of the physical environment. The map module 328 may designate one or more objects (i.e., unloaded objects, such as a product item or pallet) as unique landmarks that correspond to specific sub-areas, such as a room in a warehouse In some embodiments, the pose prediction data 318 includes an estimate of vehicle position and/or orientation of which the present disclosure may refer to as the vehicle pose prediction. The environment based navigation module 320 may produce such an estimate using a prior vehicle pose in addition to a vehicle motion model. The environment based navigation module 320 may also use a process filter to estimate uncertainty and/or noise for an upcoming vehicle pose prediction and update steps. After examining the map data 310 or a particular one of the sub-area maps 312, the environment based navigation module 320 determines an estimate of a current vehicle position. The uncertainty in a vehicle pose creates an uncertainty in the position of observed features. The pose uncertainty in the feature information 312 is derived from a combination of vehicle position uncertainty and sensor noise.

In some embodiments, the environment based navigation module 320 includes processor-executable instructions for performing localization and mapping for an industrial vehicle. The environment based navigation module 320 reduces a number of known (landmark) features to compare with the feature information 314 by eliminating portions of the map data 310 from being processed during the localization. By partitioning the map data 310 into sub-area maps 312, a number of static and/or dynamic landmarks being processed at any given time are limited to the number of landmarks in a particular sub-area map in which the industrial vehicle currently operates. Once location of the industrial vehicle, as determined by the environment based navigation module, leaves the particular sub-area the EBN module 320 selects a new sub-area map 312. The module 320 may request a sub-area map 312 from the central computer, or the central computer 106 may automatically send a new sub-area map as the vehicle approaches the edge of a prior sub-area map. In an alternative embodiment, the EBN module may contain a mobile map module 344 that extracts a sub-area map 312 from the locally stored map data 310. In either event, a map module 328/344 (global or mobile)constructs a new sub-area map 312 that corresponds with a portion of the physical environment required by the vehicle to navigate in the new location. Accordingly, the environment based navigation module 320 only uses known features associated with the new sub-area map 312. In some embodiments, the environment based navigation module 320 updates the map data 310 with new dynamic features.

Figure 4:
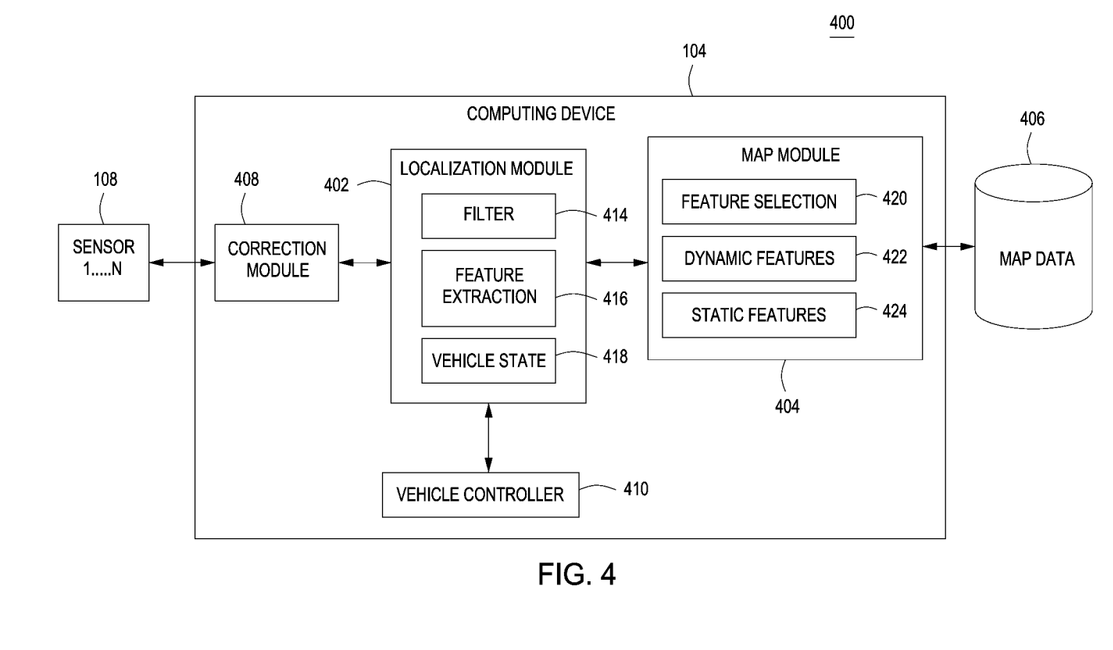
FIG. 4 is a functional block diagram of a system for providing accurate localization for an industrial vehicle according to one or more embodiments.

FIG. 4 is a functional block diagram of a system 400 for providing accurate localization for an industrial vehicle according to one or more embodiments. The system 400 includes the mobile computer 104, which couples to an industrial vehicle, such as a forklift, as well as the sensor array 108. Various software modules within the mobile computer 104 collectively form an environment based navigation module (e.g., the environment based navigation module 320 of FIG. 3).

The mobile computer 104 includes various software modules (i.e., components) for performing navigational functions, such as a localization module 402, a mapping module 404, a correction module 408, and a vehicle controller 410. The mobile computer 104 provides accurate localization for the industrial vehicle and updates map data 406 with information associated with environmental features. The localization module 402 also includes various components, such as a filter 414 and a feature extraction module 416 for determining a vehicle state 418. The map module 404 includes various data, such as dynamic features 422 and static features 424. The map module 404 also includes various components, such as a feature selection module 420.

In some embodiments, the sensor data is corrected in correction module 408 to correct for temporal and/or spatial distortion. The localization module 402 processes the corrected data and extracts features from the sensor data using feature extraction component 416. These features are matched with the features from map module 404, with the feature pose uncertainty and observation noise taken into account, and vehicle state 418 is then adjusted by the filter 414. The vehicle pose 418, which is modeled by the filter 414, refers to a current vehicle state and includes data (e.g., coordinates) that indicate vehicle position, orientation, velocity, acceleration and the like. The localization module 402 communicates data associated with the vehicle pose 418 to the mapping module 404 while also communicating such data to the vehicle controller 410. Based on the vehicle position and orientation, the vehicle controller 410 navigates the industrial vehicle to a destination.

In addition to the filter 414 for calculating the vehicle pose 418, the localization module 414 also includes the feature extraction module 416 for extracting standard features from the corrected sensor data. The map module 404 compares the vehicle pose 418 with the static features 424 and dynamic features 422 to reduce a number of features to examine by eliminating features not currently visible from the features. In some embodiments, the map module 404 partitions the map data 406 into a plurality of maps that correspond with specific sub-areas of the physical environment. The feature selection module 420 manages addition and modification of the dynamic features 422 to the map data 406. The feature selection module 420 can update the map data 406 to indicate areas recently occupied or cleared of certain features, such as known placed and picked items.

It is appreciated that the system 400 may employ several computing devices to perform environment based navigation. Any of the software modules within the computing device 104 may be deployed on different or multiple physical hardware components, such as other computing devices. The mapping module 404, for instance, may be executed on a server computer (e.g., the central computer 102 of FIG. 1) over a network (e.g., the network 302 of FIG. 4) to connect with multiple mobile computing devices for the purpose of sharing and updating the map data 406 with a current vehicle position and orientation.

In some embodiments, the correction module 402 processes sensor input messages from disparate data sources, such as the sensor array 108, having different sample/publish rates for the vehicle pose 418 as well as different (internal) system delays. The correction module 402 extracts observed pose measurements from the sensor data within these messages. The correction module 402 examines each message separately in order to preserve the consistency of each observation.

Figure 5:
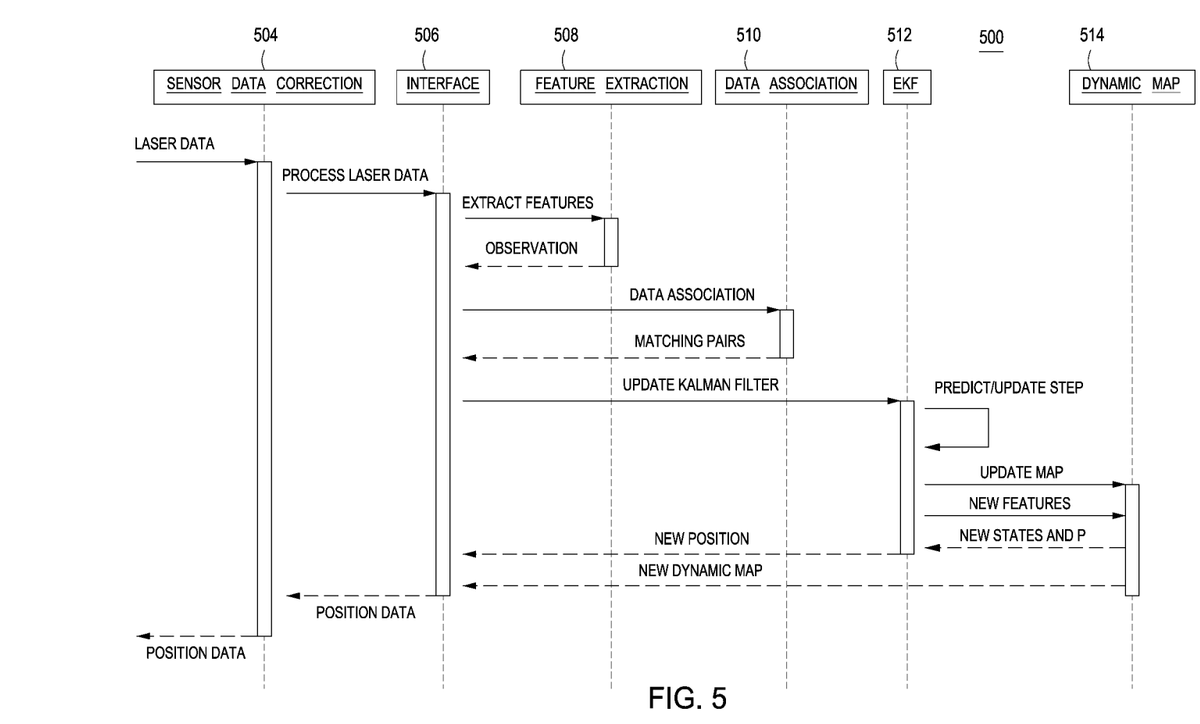
FIG. 5 is an interaction diagram illustrating a localization and mapping process for an industrial vehicle according to one or more embodiments.

FIG. 5 is an interaction diagram illustrating a localization and mapping process 500 for an industrial vehicle according to one or more embodiments. Specifically, the localization and mapping process 500 includes processing and communicating various data between components or layers 502, such as sensor data correction 504, an interface 506, feature extraction 508, data association 510, EKF 512 and dynamic map 514. The localization and mapping process 500 supports industrial vehicle operation using primarily environmental features. The interface 506 facilitates control over the layers 502 and is added to an environment based navigation module.

The feature extraction 508 examines data inputted by sensor devices and extracts observed features (e.g. lines and corners). The data association 510 compares the observed features with known feature information to identify matching features with existing static and/or dynamic map data. The EKF 512 is an extended Kalman Filter that, given measurements associated with the matching features and a previous vehicle pose, provides a most likely current vehicle pose. The dynamic map manager 514 maintains an up-to-date dynamic map of features used for localization that are not found in a-priori static map.

Figure 6:
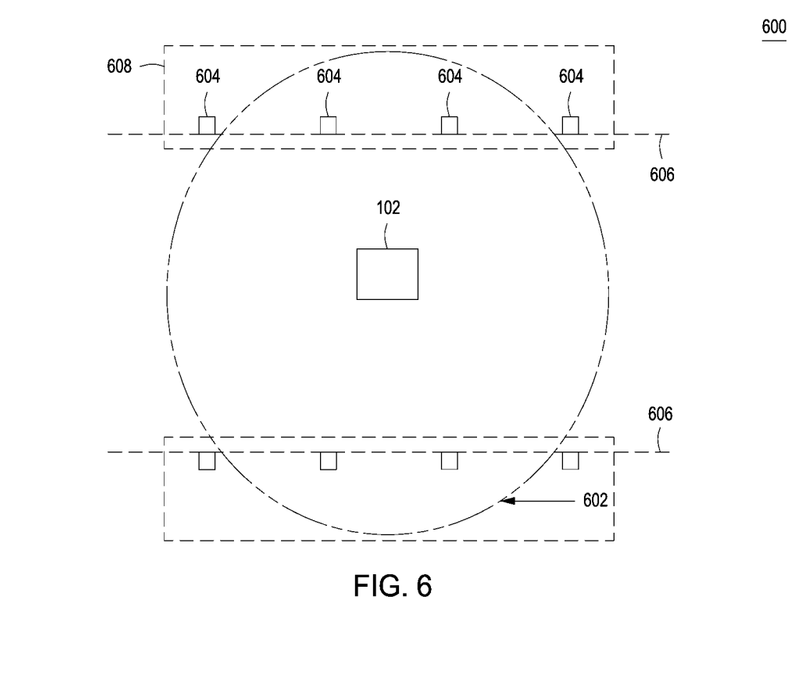
FIG. 6 is a schematic illustration of a map for estimating a position for the industrial vehicle according to one or more embodiments.

FIG. 6 is a schematic illustration of a map 600 for estimating a position for the industrial vehicle 102 according to one or more embodiments. Various software modules stored within a computer coupled to the industrial vehicle 102 execute the position estimation 600. The industrial vehicle 102 uses various sensor devices (e.g., the plurality of sensor devices 332 of FIG. 3) to sense objects within a visibility range 602. Specifically, the visibility range 602 may refer to a laser range that is formed by laser scanners. As explained further below, the industrial vehicle senses landmarks 604 whose features are used to form grid lines 606 for estimating the the pose of an industrial vehicle according to some embodiments. Furthermore, the landmarks 604 combine to form an infrastructure unit 608.

Physical environments, such as a warehouse, include landmarks having related features, which can be extracted to facilitate localization and mapping. Examples of related features include the rack legs of high density racking where the set of legs form an infrastructure unit 608. Data associated with the infrastructure unit such as the virtual line, or gridline 606, that joins each and every leg in a racking bay may be used to assist localization. In this case, the virtual feature may be treated by the localization module (the localization module 402 of FIG. 4) equivalent to a virtual wall. In the case where the vehicle 102 is moving in an aisle between two sets of racking there are two grid-lines 606 which together form an aisle. Those skilled in the art can readily see that extracting virtual features from known attributes of physical features can help overcome problems in warehouse area where usual localization landmarks such as walls and corners are not visible from sensors during majority of time in operation.

Using the laser scanners, a mobile computer (e.g., the mobile computer 104 of FIG. 1) coupled to the industrial vehicle 102 identifies racking legs, which are stored as landmarks 604. Common features amongst the racking legs indicate that these landmarks 604 are related. For example, each racking leg is similar or identical in size, shape and orientation to each other. The industrial vehicle 102 fits lines to these racking legs to provide gridlines 606 to correct a vehicle pose. When executing a task within racking aisles, walls are generally not within the range 602. Therefore, either these gridlines 606, or an aisle defined by both sets of parallel gridlines 606, can be used to adjust the vehicle position and heading. The gridline 606 and aisle is stored as a virtual feature in the map which is associated with the racking legs.

Figure 7:
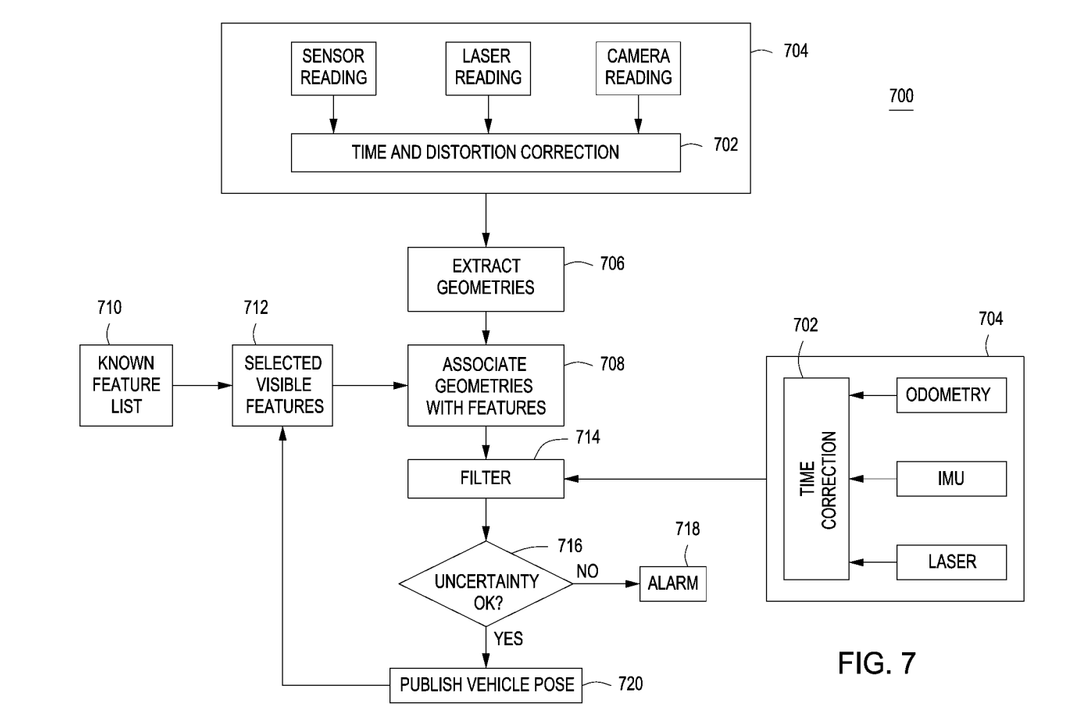
FIG. 7 is a functional block diagram illustrating a localization and mapping process for navigating an industrial vehicle according to one or more embodiments.

FIG. 7 is a functional block diagram illustrating a localization and mapping process 700 for navigating an industrial vehicle according to one or more embodiments. As sensor data is provided by a plurality of sensor devices 704, a time and distortion correction module 702 rearranges sensor input messages based on acquisition time. A geometry extract module 706 examines the corrected sensor data identifies candidate geometries from the sensor corrected sensor data. In some embodiments the known standard features 710 are selected using the current vehicle pose 712. The selection may be performed according to a specific sub-area of the physical environment, a sensor visibility constraint (e.g. the sensor range 602 of FIG. 6) or other selection criteria that are well known in the art. The geometries from the sensor data are associated with the features 708 as the resulting identified features list presented to the filter 714. Accordingly, such a reduction in a number of features to process enhances feature association data processing and filter data processing by limiting the number of features to be processed. Using the feature list and the corrected odometry sensor data, the filter 714 updates a pose prediction/estimation as well as map data.

Generally, the filter 714 provides real time positioning information (localization) for an automated industrial vehicle or manually driven vehicle. The filter 714 also helps provide data indicating uncertainty associated with the vehicle pose measurements. Thus, should the industrial vehicle temporarily travel in an empty space without available features or other environmental markers, the filter 714 continues to provide accurate localization by updating the vehicle pose along with determining indicia of uncertainty. Depending on safety requirements, the industrial vehicle may operate within a defined degree of uncertainty before an error triggers the alarm 718.

During the time and distortion correction step, the module 704 receives readings (i.e., observations) taken from each sensor device. These readings may be provided by a laser and/or camera or any other type of sensor device for extracting environment features. The time and distortion correction step 702 also corrects for any distortion that may be due to finite measurement time and the speed of travel of the industrial vehicle. This distortion occurs as the industrial vehicle and sensors are moving (e.g., during a scan), which associates a temporal characteristic with the data. The module 706 extracts various environment features from the sensor data, such as a line, corner, arc, or marker, which are provided in a standard geometry format for data association 708. Pose measurements from the sensor devices 704 provide a relative change in position, velocity, or acceleration. These measurements are used to update the estimated pose of the industrial vehicle. The known feature list 710 includes a map of a physical environment. The data association 708 compares a subset of the known feature list 710 provided by feature selection 712 with the extracted standard geometries in order to estimate vehicle position.

In some embodiments, the vehicle pose include x-y coordinates associated with the vehicle position as well as a vehicle heading. The odometry data provides gives a linear velocity and a rotational velocity. The linear velocity refers to the velocity of the wheel upon which an encoder or velocity measurement device is installed. The rotational velocity indicates how much the heading of the vehicle has changed with respect to the global coordinate system and the vehicle. The filter 714 corrects the vehicle pose by eliminating process noise (i.e., odometry noise) by modeling wheel slip (proportional to linear velocity) and angular slip (proportional to angular velocity).

Figure 8:
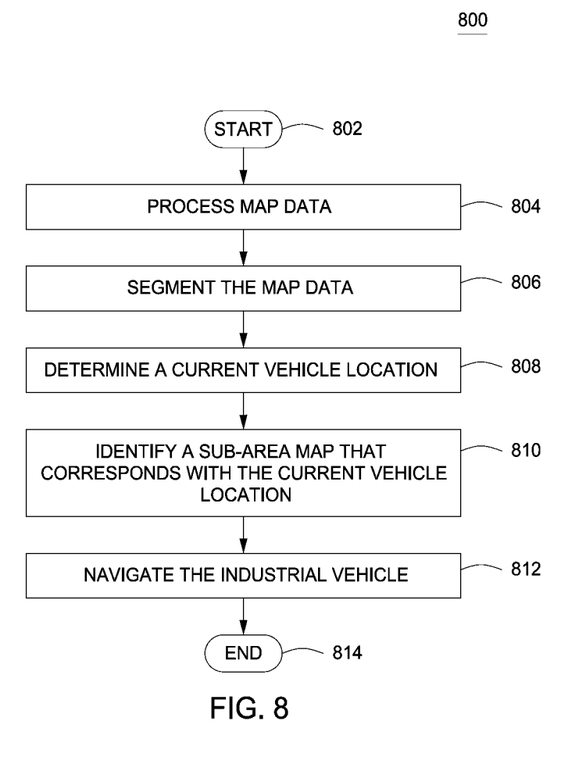
FIG. 8 is a flow diagram of a method for partitioning map data into sub-area maps according to one or more embodiments.

FIG. 8 is a flow diagram of a method for partitioning map data into sub-area maps according to one or more embodiments. In some embodiments, an environment based navigation module (e.g., the environment based navigation module 320 of FIG. 3) or a mapping module (e.g., the mapping module 328 of FIG. 3) performs each and every step of the method 800. In other embodiments, some steps are omitted or skipped. The environment based navigation module is stored within a mobile computer (e.g., the mobile computer 104 of FIG. 1) that is operably coupled to an industrial vehicle (e.g., the industrial vehicle 102 of FIG. 1). The map module is stored within a central computer or mobile computer (e.g., the central computer 106 or mobile computer 104 of FIG. 1) that communicates with the industrial vehicle as well as one or more second industrial vehicles. When performing a task (e.g., the task 330 of FIG. 3), the central computer instructs the mobile computer to navigate the industrial vehicle along a particular path (e.g., the path 319 of FIG. 3). The method 800 starts at step 802 and proceeds to step 804.

At step 804, the method 800 processes map data (e.g., the map data 310 of FIG. 3). In some embodiments, the environment based navigation module examines the map data in order to localize the industrial vehicle. Before following the path, the environment based navigation must determine an accurate vehicle pose. The map module may optionally communicate map data (e.g., the map data 310 of FIG. 3) to the mobile computer. Such map data may be a global map of an entire physical environment (e.g., the physical environment 100 of FIG. 1) or a sub-area map.

At step 806, the method 800 segments the map data into a plurality of sub-area maps. Each sub-area map may be associated with a certain portion of the physical environment, such as a specific room of a warehouse. In order to perform the partition of the map data, the method 800 uses feature information associated with the physical environment. The method 800 defines a sub-area map based on vehicle pose and other available information such as the planned path for the vehicle. These sub-area maps contains a subset of landmarks expected to be seen by the vehicle given its pose and, for example, planned path. These landmarks may include static, dynamic, and/or virtual features.

At step 808, the method 800 determines a current vehicle location. In some embodiments, the method 800 accesses the map data and extracts a vehicle pose (e.g., the vehicle pose 318) that includes the current vehicle location. At step 810, the method 800 generates a sub-area map that corresponds with the current vehicle location. The sub-area map includes feature information for a sub-area of the physical environment that would be likely to be observed by the industrial vehicle.

At step 812, the method 800 navigates the industrial vehicle using the identified sub-area map. The environment based navigation module directly controls vehicle operations and navigates the industrial vehicle along the path according to some embodiments. When the industrial vehicle leaves the sub-area, the method 800 identifies another sub-area map that corresponds with a new vehicle location. In some embodiments, the environment based navigation module requests the other sub-area map from the map module and the map module creates the sub-area map upon request. In other embodiments, the map module selects the other sub-area map from the plurality of sub-area maps.

In one embodiment, the sub-area maps are generated (or selected) as a sequence. Each map is provided by the map module prior to the vehicle reaching the edge of the current map. The maps generally overlap in coverage such that a gap in map information is not created as the vehicle moves from one sub-area map coverage to the next.

At step 814, the method 800 ends.

Figure 9:
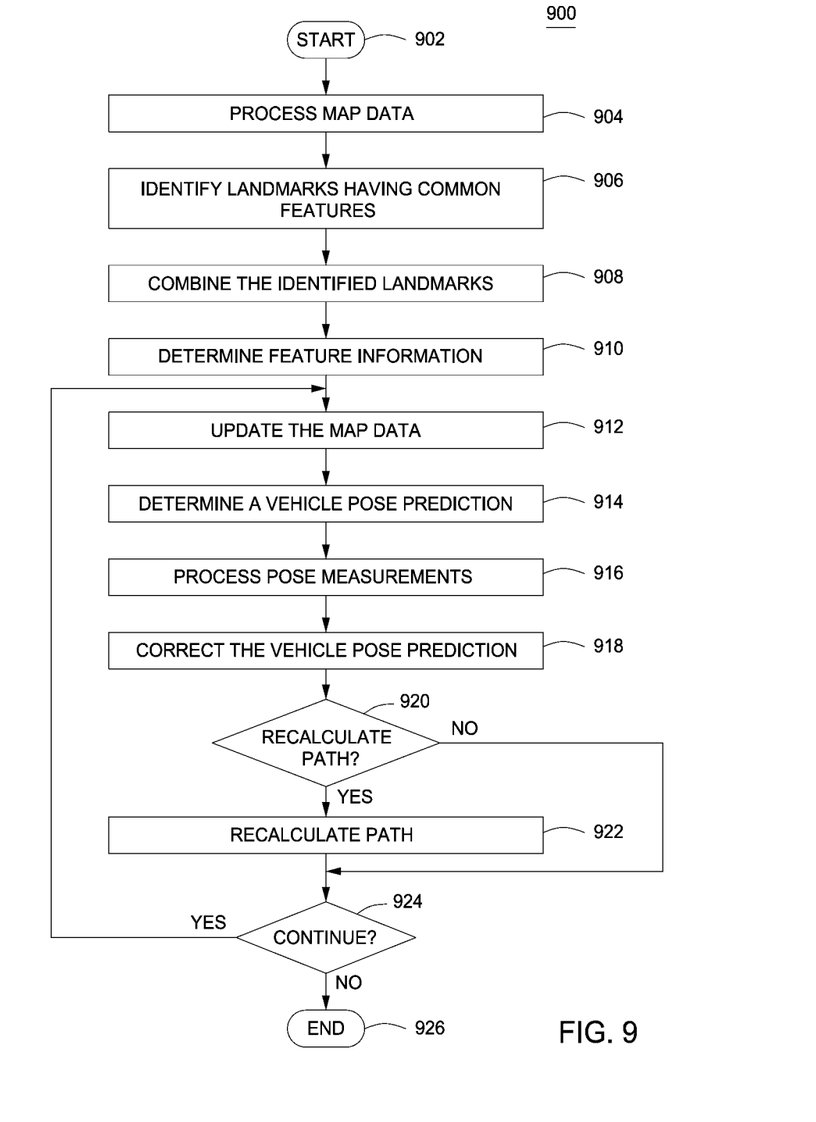
FIG. 9 is a flow diagram of a method for facilitating map data processing according to one or more embodiments.

FIG. 9 is a flow diagram of a method 900 for facilitating map data processing according to one or more embodiments. In some embodiments, an environment based navigation module (e.g., the environment based navigation module 320 of FIG. 3) or a mapping module (e.g., the map module 328/344 of FIG. 3) performs each and every step of the method 900. In other embodiments, some steps are omitted or skipped. The environment based navigation module is stored within a mobile computer (e.g., the mobile computer 104 of FIG. 1) that is operably coupled to an industrial vehicle (e.g., the industrial vehicle 102 of FIG. 1). The map module is stored within a central computer or the mobile computer that communicates with the industrial vehicle as well as one or more second industrial vehicles. When performing a task (e.g., the task 430 of FIG. 3), the central computer instructs the mobile computer to navigate the industrial vehicle along a particular path (e.g., the path 319 of FIG. 3).

The method 900 starts at step 902 and proceeds to step 904. At step 904, the method 900 processes map data by selecting a subset of features from the map that are likely to be observed by the industrial vehicle. Processing the map data will reduce the number and landmarks and consequently features to be processed by the industrial vehicle to those in the proximate area of the industrial vehicle. At step 906, the method 900 identifies landmarks that have common features to which virtual landmarks may be mapped. These landmarks may include static (e.g. racking legs), dynamic (e.g. pallets placed during system operation). At step 908 the identified landmarks are mapped to the virtual landmarks stored in the map (e.g. the aisle formed by rows of racking system). At step 910 all landmarks are expanded into features that may be detected by the sensor array 108 associated with an industrial vehicle. These features may be geometric representation of the physical landmarks, such as lines and arcs.

At step 912, the method 900 updates the map data with the selected feature information. In some embodiments, the method 900 fits the feature information with known feature information for the infrastructure unit. For example, the method 900 compares the feature information with known dimension data for the racking system. At step 914, the method 900 determines a vehicle pose prediction according to odometry sensor data (e.g., pose prediction data 318 of FIG. 3). In some embodiments, the method 900 examines a previous vehicle pose and predicts a new vehicle pose after a time interval. At step 916, the method 900 processes pose measurements. At step 918, the method 900 corrects the vehicle pose prediction. After sensing pose measurement data (e.g., the pose measurement data 316 of FIG. 3) related to one or more landmarks, the method 900 updates the vehicle pose prediction to produce an accurate vehicle pose.

At step 920, the method 900 determines whether the change to the map requires the vehicle to recalculate a path in order to complete the task (e.g., the path 319 of FIG. 3). If the method 900 decides to recalculate the path, the method 900 proceeds to step 922. If, on the other hand, the method 900 decides not to update the path, the method 900 proceeds to step 924. At step 922, the method 900 recalculates the path. At step 924, the method 900 determines whether to continue performing localization and mapping for executing the task. If the method 900 decides to continue performing the localization and mapping, the method 900 returns to step 912. If, on the other hand, the method 900 decides not to continue, the method 900 proceeds to step 926. At step 926, the method 900 ends.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A method of partitioning map data for industrial vehicle navigation in a physical environment, wherein:

the physical environment comprises static features representing objects that do not change within the physical environment and dynamic features representing objects that change within the physical environment;

the industrial vehicle comprises a mobile computer and a sensor array communicably coupled to the mobile computer;

the mobile computer comprises a central processing unit and a memory comprising an environment based navigation module, a feature selection module, map data representing static features within the physical environment, and a plurality of sub-area maps;

the sensor array comprises a plurality of devices mounted to the industrial vehicle for monitoring the physical environment and producing sensor data representing the physical environment; and the method comprises segmenting the physical environment, as represented by the map data, into a plurality of sub-areas with corresponding map data stored in the plurality of sub-area maps, utilizing the environment based navigation module and environmental features extracted from the sensor data to determine a location of the industrial vehicle relative to a particular sub-area, utilizing the environment based navigation module to derive respective pose uncertainties associated with the dynamic features based upon data comprising noise in the sensor data and uncertainty in the determined location of the industrial vehicle;

selecting a sub-area map for use by the environment based navigation module based on the determined location of the industrial vehicle, updating the selected sub-area map to include dynamic features within the particular sub-area corresponding to the selected sub-area map based on environmental features in the sensor data produced by the sensor array and the respective pose uncertainties associated with the dynamic features within the particular sub-area, utilizing the feature selection module to manage the addition of dynamic features to the sub-area map based on the respective pose uncertainties associated with the dynamic features, utilizing the environment based navigation module, the sensor data, and the updated sub-area map to determine an updated location of the industrial vehicle, and navigating the industrial vehicle using the updated sub-area map and the updated location of the industrial vehicle.

2. A method as claimed in claim 1 wherein the selected sub-area map is updated by using the feature selection module to eliminate features that are not currently visible within the sensor data.

3. A method as claimed in claim 1 wherein the selected sub-area map is updated by using the feature selection module to include only those features that are visible within the sensor data.

4. A method as claimed in claim 1 wherein the particular sub-area corresponds to an area of the physical environment within a field of view of the sensor array of the industrial vehicle.

5. A method as claimed in claim 1 wherein the method further comprises triggering an alarm when the uncertainty in the determined location of the industrial vehicle exceeds a defined degree of uncertainty.

6. A method as claimed in claim 1 wherein the dynamic features are used to update the selected sub-area map by superimposing vehicle centric measurements from the sensor array devices onto an estimated pose of the industrial vehicle with respect to a global coordinate system.

7. A method as claimed in claim 6 wherein the estimated pose of the industrial vehicle refers to a current vehicle state and comprises position data, orientation data, and velocity data.

8. A method as claimed in claim 1 wherein the sensor array comprises a camera.

9. A method as claimed in claim 1 wherein the sub-area map is selected by requesting the sub-area map from the mobile computer.

10. A method as claimed in claim 1 wherein the sub-area map is selected automatically when the industrial vehicle approaches the edge of a prior sub-area map.

11. A method as claimed in claim 1 wherein the mobile computer is in communication with a second industrial vehicle and the selected sub-area map is updated to include feature information that is communicated by the second industrial vehicle.

12. A method as claimed in claim 1 wherein:

the physical environment comprises a dynamic shared use area in which pallets are expected to be placed on a floor of the physical environment; and the dynamic features of the physical environment represent pallets placed on the floor of the physical environment.

13. A method as claimed in claim 12 wherein the feature selection module is further utilized to update map data to indicate areas recently occupied by or cleared of placed or picked items.

14. A method of partitioning map data for industrial vehicle navigation in a physical environment, wherein:

the physical environment comprises a dynamic shared use area in which pallets are expected to be placed on a floor of the physical environment and comprises static features representing objects that do not change within the physical environment and dynamic features representing pallets placed on the floor of the physical environment;

the industrial vehicle comprises a mobile computer and a sensor array communicably coupled to the mobile computer;

the mobile computer comprises a central processing unit and a memory comprising an environment based navigation module, a feature selection module, map data representing static features within the physical environment, and a plurality of sub-area maps;

the sensor array comprises a plurality of devices mounted to the industrial vehicle for monitoring the physical environment and producing sensor data representing the physical environment;

the method comprises segmenting the physical environment, as represented by the map data, into a plurality of sub-areas with corresponding map data stored in the plurality of sub-area maps;

utilizing the environment based navigation module and environmental features extracted from the sensor data to determine a location of the industrial vehicle relative to a particular sub-area;

utilizing the environment based navigation module to derive respective pose uncertainties associated with the dynamic features based upon data comprising noise in the sensor data and uncertainty in the determined location of the industrial vehicle;

selecting a sub-area map for use by the environment based navigation module based on the determined location of the industrial vehicle;

updating the selected sub-area map to include dynamic features within the particular sub-area corresponding to the selected sub-area map based on environmental features in the sensor data produced by the sensor array and the respective pose uncertainties associated with the dynamic features within the particular sub-area, and by using the feature selection module to eliminate dynamic features that are not currently visible within the sensor data;

utilizing the feature selection module to manage the addition of dynamic features to the sub-area map based on the respective pose uncertainties associated with the dynamic features and to update map data to indicate areas recently occupied by or cleared of placed or picked items;

utilizing the environment based navigation module, the sensor data, and the updated sub-area map to determine an updated location of the industrial vehicle; and navigating the industrial vehicle using the updated sub-area map and the updated location of the industrial vehicle.

* * * * *